United States Patent
Choi et al.

(10) Patent No.: US 9,533,265 B2
(45) Date of Patent: Jan. 3, 2017

(54) GAS SEPARATION MEMBRANE AND METHOD OF PREPARING THE SAME

(71) Applicants: Samsung Electronics Co., Ltd., Suwon-si, Gyeonggi-do (KR); Industry-University Cooperation Foundation Hanyang University, Seoul (KR)

(72) Inventors: Jae-young Choi, Suwon-si (KR); Ho-bum Park, Seoul (KR); Seon-mi Yoon, Yongin-si (KR); Hyo-won Kim, Seoul (KR); Byung-kook Ahn, Seoul (KR); Byung-min Yoo, Seoul (KR); Hee-wook Yoon, Seoul (KR)

(73) Assignees: SAMSUNG ELECTRONICS CO., LTD., Gyeonggi-Do (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 139 days.

(21) Appl. No.: 13/767,323

(22) Filed: Feb. 14, 2013

(65) Prior Publication Data
US 2013/0305927 A1   Nov. 21, 2013

(30) Foreign Application Priority Data
May 17, 2012  (KR) .................. 10-2012-0052592

(51) Int. Cl.
| B01D 53/22 | (2006.01) |
| B01D 71/02 | (2006.01) |
| B01D 67/00 | (2006.01) |

(52) U.S. Cl.
CPC .......... *B01D 71/021* (2013.01); *B01D 53/228* (2013.01); *B01D 67/0048* (2013.01)

(58) Field of Classification Search
CPC ....... B01D 69/12; B01D 71/64; B01D 53/228; B01D 71/021; B01D 67/0048
USPC .................................... 96/13, 8, 9
See application file for complete search history.

(56) References Cited

U.S. PATENT DOCUMENTS

| 7,999,027 B2 * | 8/2011 | Zhamu et al. ............... 524/495 |
| 8,449,959 B2 * | 5/2013 | Aksay et al. ............... 428/35.7 |
| 8,552,075 B2 * | 10/2013 | Tsai et al. ..................... 521/27 |
| 8,636,830 B2 * | 1/2014 | Barron et al. ................. 95/139 |
| 8,691,179 B2 * | 4/2014 | Kim et al. .................... 423/448 |
| 8,703,090 B2 * | 4/2014 | Tour et al. ................. 423/447.1 |
| 8,921,824 B2 | 12/2014 | Shin et al. |

(Continued)

FOREIGN PATENT DOCUMENTS

| KR | 19940000137 A | 1/1994 |
| KR | 19990060685 A | 7/1999 |

(Continued)

OTHER PUBLICATIONS

Channon, Martin. Knowledge Organization. 2011, vol. 38 Issue 4, p. 321-327.*

(Continued)

*Primary Examiner* — Anthony Shumate
(74) *Attorney, Agent, or Firm* — Cantor Colburn LLP (57) ABSTRACT

A gas separation membrane including a porous layered support; and a gas separating active layer which is disposed on the porous layered support and includes a functionalized graphene.

11 Claims, 10 Drawing Sheets

(56) References Cited

U.S. PATENT DOCUMENTS

| | | | |
|---|---|---|---|
| 2010/0105834 A1* | 4/2010 | Tour et al. | 525/50 |
| 2010/0323177 A1 | 12/2010 | Ruoff et al. | |
| 2011/0033688 A1 | 2/2011 | Veerasamy | |
| 2011/0051316 A1 | 3/2011 | Liu et al. | |
| 2011/0079748 A1* | 4/2011 | Ruoff | B82Y 30/00 252/62.2 |
| 2012/0129736 A1* | 5/2012 | Tour et al. | 507/140 |
| 2012/0197051 A1* | 8/2012 | Tour et al. | 585/26 |
| 2012/0248401 A1 | 10/2012 | Shin et al. | |
| 2012/0258575 A1* | 10/2012 | Sato et al. | 438/151 |
| 2013/0122220 A1 | 5/2013 | Won et al. | |
| 2013/0184144 A1* | 7/2013 | Liang et al. | 502/4 |
| 2013/0187097 A1 | 7/2013 | Hong et al. | |
| 2013/0190449 A1* | 7/2013 | Kinloch et al. | 525/50 |
| 2013/0192460 A1* | 8/2013 | Miller et al. | 95/47 |
| 2013/0192461 A1* | 8/2013 | Miller et al. | 95/47 |
| 2013/0270188 A1* | 10/2013 | Karnik et al. | 210/650 |
| 2013/0305927 A1 | 11/2013 | Choi et al. | |
| 2014/0037944 A1* | 2/2014 | Dichtel et al. | 428/336 |
| 2014/0060643 A1* | 3/2014 | Martin et al. | 136/256 |
| 2014/0065368 A1* | 3/2014 | Aytug et al. | 428/142 |
| 2014/0069277 A1* | 3/2014 | Choi et al. | 96/13 |
| 2014/0120024 A1* | 5/2014 | Tour et al. | 423/415.1 |
| 2014/0178670 A1* | 6/2014 | Takahashi et al. | 428/323 |
| 2014/0178792 A1* | 6/2014 | Yang et al. | 429/482 |
| 2014/0186663 A1* | 7/2014 | Hiroki et al. | 429/57 |
| 2014/0216946 A1* | 8/2014 | Milner et al. | 205/743 |
| 2014/0227548 A1* | 8/2014 | Myrick | 428/570 |
| 2014/0230653 A1* | 8/2014 | Yu et al. | 96/11 |
| 2014/0311967 A1* | 10/2014 | Grossman et al. | 210/500.21 |
| 2014/0322518 A1* | 10/2014 | Addleman et al. | 428/304.4 |

FOREIGN PATENT DOCUMENTS

| | | |
|---|---|---|
| KR | 1020100114827 A | 10/2010 |
| KR | 20100117570 A | 11/2010 |
| KR | 1020110039568 A | 4/2011 |
| KR | 1020110056515 A | 5/2011 |
| KR | 1020110110067 A | 10/2011 |
| KR | 1020120083194 A | 7/2012 |
| WO | 2009085015 A1 | 7/2009 |
| WO | 2010014215 A2 | 2/2010 |
| WO | 2010074918 A1 | 7/2010 |

OTHER PUBLICATIONS

"Derived" Webster's Third New International Dictionary, Unabridged, 1993.*

Kim et al., "Selective Gas Transport Through Few-Layered Graphene and Graphene Oxide Membranes", Science, vol. 342, Oct. 4, 2013, pp. 91-95.

Kim et al., "Supplementary Materials for Selective Gas Transport Through Few-Layered Graphene and Graphene Oxide Membranes", Science, vol. 342, No. 91, 2013, pp. 1-17.

Ganhua Lu et al., "Reduced graphene oxide for room-temperature gas sensors", Nanotechnology 20, 2009, 9pp.

Hye Min Kim et al., "Transparent and high gas barrier films based on poly(vinyl alcohol)/graphene oxide composites", Thin Solid Films 519, 2011, pp. 7766-7771.

H. Suda, K. Haraya, J. Phys. Chem. B (1997)101, 3988, Gas Permeation through Micropores of Carbon Molecular Sieve Membranes Derived from Kapton Polyimide.

Vineet Dua et al., "All-Organic Vapor Sensor Using Inkjet-Printed Reduced Graphene Oxide", Angew. Chem. Int. Ed., 49, 2001, pp. 2154-2157.

Brodie, B.C., Sur le poids atomique du graphite, Ann. Chim. Phys. 1860; 59:466-72.

Hummers W., and Offeman R., Preparation of graphitic oxide, J. Am. Chem. Soc. 1958; 80:1339.

Staudenmaier L. Verfahren zur darstellung der graphitsaure, Ber Dtsch Chem Ges 1898; 31:1481-11.

Nair et al., "Unimpeded Permeation of Water Through Helium-Leak-Tight Graphene-Based Membranes", Science, vol. 335, Jan. 27, 2012, pp. 442.

Suda et al., "Gas Permeation through Micropores of carbon Molecular Sieve Membranes Derived from Kapton Polyimide", J. Phys. Chem. B., vol. 101, 1997, pp. 3988-3994.

Shiflett et al., "Characterization of Supported Nanoporous Carbon Membranes**", Advanced Materials, vol. 12, No. 1, 2000, pp. 21-25.

* cited by examiner

GAS SEPARATION MEMBRANE AND METHOD OF PREPARING THE SAME

This application claims priority to and the benefit of Korean Patent Application No. 10-2012-0052592, filed on May 17, 2012, and all the benefits accruing therefrom under 35 U.S.C. §119, the content of which is incorporated herein in its entirety by reference.

BACKGROUND

1. Field

The present disclosure relates to a gas separation membrane and a method of preparing the same, and more particularly, to a gas separation membrane that has a high gas permeation rate and excellent selectivity and processability.

2. Description of the Related Art

Gas separation processes include membrane separation processes, pressure swing adsorption (PSA) processes, cryogenic processes, and the like. PSA and cryogenic processes, the designs and operations of which have been developed, are technologies currently in common use, while gas separation using membrane separation is relatively new.

A gas separation processes using a polymer membrane has been commercialized with a gas separation membrane module in the "Prism" product by Monsanto Co. in 1977. The system is relatively low in energy consumption, provides for reduced investment in plant and equipment costs compared to existing methods, and it has an increasing annual share in the gas separation market.

Gas separation membrane materials used so far are largely organic polymers, including polysulfone, polycarbonate, polypyrrolones, polyarylate, cellulose acetate, polyimide, and the like. Although some polymer materials show high separation efficiency with respect to specific gas mixtures, most polymer materials have seen very limited application because of their high cost and difficulties in manufacturing separation membranes in a form suitable for industrial use, for example, in the form of a planar thin film sheet or a hollow thread.

In general, natural and synthetic polymer gas separation membranes in the form of a dense solid phase structure (such as planar membrane, composite membrane, or a hollow thread) may exhibit high selectivity with respect to gas mixtures, and have been manufactured largely as an asymmetric membrane with a thin selective separation layer on a porous support to increase the gas permeation rate.

For example, a gas separation membrane having a carbon molecular sieve (CMS) active layer on a metal or ceramic porous support is known as a membrane having a selective permeability.

Figure 1:
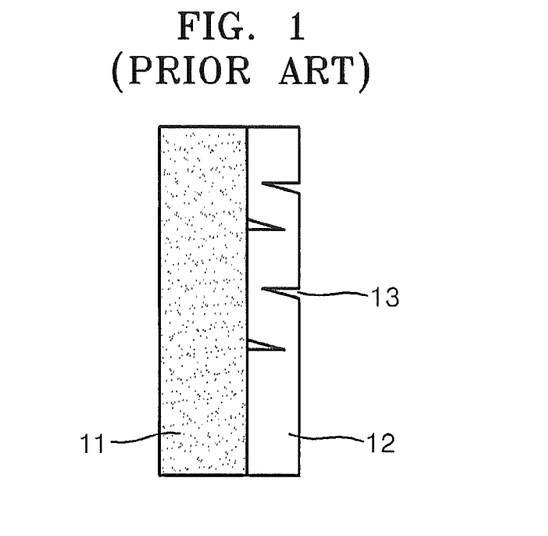
FIG. 1 schematically illustrates a cross-section of a gas separation membrane including a carbon molecular sieve (CMS) active layer according to the prior art.

The gas separation membrane having a CMS active layer may be used in gas separation, precision filtration, or ultrafiltration and is prepared by thermal decomposition of polymers at a temperature of 600° C. or higher. The high decomposition temperature results in manufacturing processes that are energy intensive and complicated, and due to a different coefficient of thermal expansion with the metal or ceramic porous support, cracks or pinholes are formed in the CMS active layer, and thus efficiency of such a gas separation membrane may be decreased. FIG. 1 schematically illustrates a cross-section of a prior art gas separation membrane. As shown in FIG. 1, a plurality of cracks and pinholes 13 are formed in a CMS active layer 12, which is formed on a metal or ceramic porous support 11. As a result, selectivity for gas significantly drops due to the cracks and pinholes 13 formed on the CMS active layer 12.

Therefore there remains a need for an improved gas separation membrane.

SUMMARY

Provided is a gas separation membrane with a high gas permeation rate, an excellent selectivity for selected gas mixtures, and an improved processability.

Provided is a method of preparing the gas separation membrane.

Additional aspects will be set forth in part in the description which follows and, in part, will be apparent from the description.

According to an aspect, a gas separation membrane includes a porous layered support; and a gas separating active layer which is disposed on the porous layered support and includes a functionalized graphene.

The functionalized graphene may include a graphene oxide, a reduced graphene oxide, or a combination thereof.

According to another aspect, a method of preparing a gas separation membrane includes providing a composition by contacting a functionalized graphene with a solvent; disposing the composition on a porous layered support to form a coating; and drying the coating to form a gas separating active layer including the functionalized graphene on the porous layered support to prepare the gas separation membrane.

The method may further include reducing the functionalized graphene.

Also disclosed is a gas separator including the gas separation membrane.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "graphene" as used in the present specification means a polycyclic aromatic molecule formed from a plurality of carbon atoms which are covalently bound to each other. The covalently bound carbon atoms may form a six-membered ring as a repeating unit, and may further include a five-membered ring and/or a seven-membered ring. Accordingly, graphene comprises a single layer of covalently bonded carbon atoms having $sp^2$ hybridization. A plurality of graphene layers is often referred to in the art as graphite. However, for convenience, "graphene" as used herein may be a single layer, or also may comprise a plurality of layers of carbon. Thus graphene, as used herein, may have a multiply layered structure formed by stacking single layers of graphene.

A gas separation membrane according to an embodiment includes a porous layered support and a gas separating active layer, which is disposed on, e.g., formed on, the porous layered support and includes a functionalized graphene. The gas separation membrane according to an embodiment includes the functionalized graphene in the gas separating active layer. The gas separating active layer comprising the functionalized graphene is distinct from a carbon molecular sieve (CMS) active layer, which is prepared by carbonizing a polymer at a high temperature. The gas separation membrane comprising the gas separating active layer which comprises the functionalized graphene provides improved processability and modularity by including the functionalized graphene, which can be easily prepared.

The term "functionalized graphene" as used herein refers to a product of functionalizing graphite to provide a carbon layer with a functional group attached thereon, e.g., through a chemical reaction, wherein a representative example of the functionalized graphene may be graphene oxide, graphite oxide, reduced graphene oxide, or the like, or a combination thereof. Unlike graphite, the graphene oxide includes an oxygen-containing functional group, such as a hydroxyl group, an epoxide group, a carboxyl group, a ketone group, a lactone group, an aldehyde group, an ester group, a carbonate group, a peroxide group, an ether group, an acetal group, an acetal group, or the like, or a combination thereof, on a carbon layer, and thus, dispersion and/or dissolution of a graphene sheet is convenient and fabrication of a thin film is facilitated. Also, a content of the oxygen-containing functional group of the graphene oxide may be selected by a degree of reduction of the graphene oxide. Further the oxygen-containing functional group may be substituted with another functional group by contacting the graphene oxide with a source of the other functional group. The other functional group may be a nitrogen functional group, a phosphorus functional group, a sulfur functional group, a hydrocarbon functional group, a halogen functional group, or a combination thereof. The source of the other functional group may be, for example, an alkyl amine such as methylamine, ethylene oxide, an acid chloride, nitric acid, phosphoric acid, a thiol, or hydrochloric acid.

A carbon to oxygen (C/O) ratio of the functionalized graphene may be about 1 to about 9.5, specifically about 2 to about 8, more specifically about 3 to about 7.

The term "graphene oxide" as used herein refers to an oxide that is formed by oxidizing graphite which includes graphite oxide. The graphene oxide includes an oxygen-containing functional group, such as a hydroxyl group, an epoxide group, a carboxyl group, a ketone group, a lactone group, an aldehyde group, an ester group, a carbonate group, a peroxide group, an ether group, an acetal group, an acetal group, or the like, or a combination thereof, in a carbon layer, and thus a distance between stacked layers of the graphene oxide is increased so that the distance between the stacked layers of the graphene oxide is sufficient for gas molecules to permeate. The term "reduced graphene oxide" as used herein refers to a reduced substance that is obtained by reducing graphene oxide. The reduced graphene oxide does not include a graphene of a complete form (e.g., having a C=C/C—C fully conjugated structure) but includes a fewer number of C=C bonds than graphene and may comprise oxygen atoms and/or nitrogen atoms amongst the carbon atoms.

A pore size of the porous layered support may be, for example, about 1 nanometer (nm) to about 100 nm, specifically about 2 nm to about 90 nm, more specifically about 4 nm to about 80 nm, and the layered support may include any suitable material selected from a metal, a ceramic, a glass, a polymer, or the like, or a combination thereof.

The metal may comprise any suitable metal of Groups 3 to 14 of the Periodic Table of the Elements, specifically Ti, Fe, Ni, Cu, Ag, Zn, Al, Sn, or a combination thereof. In an embodiment, the metal may be iron, steel, stainless steel, or the like, or a combination thereof.

The ceramic may be at least one selected from glass, $Al_2O_3$, zirconia, $TiO_2$, and zeolite. The glass may be any suitable glass, and may be an aluminosilicate glass, soda-lime glass, soda aluminosilicate glass, aluminoborosilicate glass, borosilicate glass, silicate glass, or a combination thereof. A glass-ceramic, which comprises the glass and the ceramic, is mentioned.

The polymer may be any suitable polymer, and may be a polysulfone, polyvinylidene fluoride, cellulose or a derivative thereof such as cellulose acetate or cellulose nitrate, polyacrylonitrile, polyethersulfone, polyimide, or the like, or a combination thereof.

A thickness of the porous layered support may be about 25 micrometers (μm) to about 400 μm, or from about 40 μm to about 200 μm, but is not limited thereto.

When the porous layered support is omitted, mechanical properties of the gas separation membrane may be degraded, and when the thickness of the porous layered support is in the range above, suitable gas permeability may be provided.

The gas separating active layer, which is disposed (e.g., formed) on the porous layered support, includes a functionalized graphene, wherein the functionalized graphene includes, for example, a graphene oxide, a reduced graphene oxide, or a combination thereof. Here, the gas separating active layer may have a multi-layer structure of 2 or more layers. The gas separating active layer may comprise 1 to about 100, specifically about 2 to about 80, more specifically about 3 to about 60 layers of the functionalized graphene.

Figure 2:
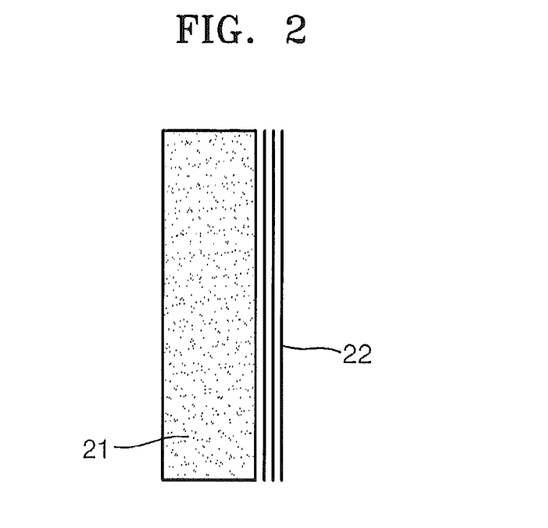
FIG. 2 is a schematic cross-sectional view of an embodiment of a gas separation membrane.

FIG. 2 is a schematic cross-sectional view of an embodiment of a gas separation membrane. A gas separating active layer 22 is disposed on, e.g., formed on, a porous layered support 21. In an embodiment, the gas separating active layer 22 may include a plurality of layers of a functionalized graphene, wherein the functionalized graphene comprises graphene oxide, a reduced graphene oxide, or a combination thereof.

The gas separating active layer 22 may include a layer of a functionalized graphene, at least a portion of which may not have a crack. In an embodiment the functionalized graphene is graphene oxide. For example, at least a portion of the gas separating active layer may be crack-free. In an embodiment, about 10 to about 99.9%, specifically about 20 to about 99%, more specifically about 40 to about 98% of the functionalized graphene is crack-free. In an embodiment wherein cracks are present, the cracks may comprise a micro-crack having a width of about 5 μm or less, for example, about 100 nm or less. In an embodiment, a largest crack of the gas separating active layer 22 has a width of about 5 μm or less, specifically about 1 μm or less, more specifically about 0.1 μm or less. In another embodiment, a mean crack width of the gas separating active layer 22 is about 5 μm or less, specifically about 100 nm or less, more specifically about 50 nm or less.

The term "crack" as used herein refers to a fissure, e.g., an opening that may result from a fracture that may be arise during a process of forming the gas separating active layer, e.g., the graphene oxide layer, and indicates a longitudinal fissure on a surface of the gas separating active layer, which may appear in a form of a fissure with a width of 5 μm or greater. When a crack with a width of 5 μm or greater is present on the surface of the gas separating active layer, selective permeation of gas may be difficult, and thus a thickness of the gas separation membrane could be increased to provide selective gas permeation. However, if the thickness of the gas separation membrane is increased, gas permeability decreases. Therefore, control of cracks is desirable in order to form a thin gas separation membrane.

In the gas separation membrane according to an embodiment, the gas separating active layer includes a functionalized graphene layer in the form of a thin film without cracks, or wherein a largest crack has a width of 5 μm or less, specifically 1 μm or less, more specifically about 0.1 μm or less, and thus a gas selectivity and permeability of the gas separating active layer may be improved.

Graphene has barrier properties such that a gas may not substantially permeate through crack-free graphene. However, graphene grown using chemical vapor deposition (CVD) is polycrystalline and has grain boundaries, and thus a gas may permeate through the graphene due to wrinkles and/or defects that may be formed during the manufacturing processes. Herein, grain boundaries are regarded as a type of crack. Also, a multi-layered graphene grown using CVD may have a turbostratic structure (e.g., turbostratic disorder) so that it has a structure that is different from a graphite structure, such as a Bernal structure or ABA structure, and thus interlayer interaction in the graphene may be weaker than in Bernal or ABA graphite.

In order to increase permeability of a gas separating active layer, a distance between layers is desirably increased, so that a gas can better permeate therethrough, e.g., between graphene oxide layers. Therefore, a distance between the layers may be increased by functionalizing the graphene, and a thin film of interconnected flakes of the functionalized graphene may be used to provide improved gas permeation.

Figure 3:
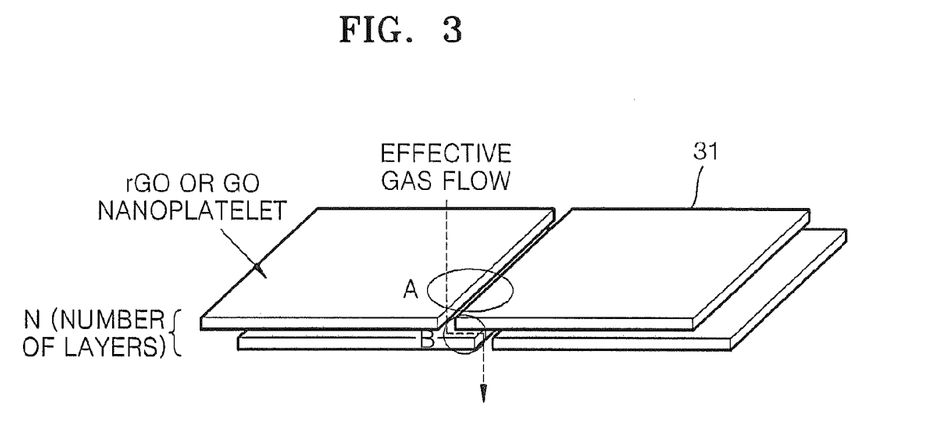
FIG. 3 is an illustration schematically explaining gas selectivity and permeability of an embodiment of a gas separation membrane.

While not wanting to be bound by theory, FIG. 3 is an illustration explaining a principle of gas permeation in an embodiment of a gas separation membrane comprising a gas separating layer comprising flakes 31 of the functionalized graphene. While not wanting to be bound by theory, it is understood that the gas permeation occurs when a gas enters through a space between adjacent flakes or through a crack in a flake of the functionalized graphene, wherein the functionalized graphene may comprise graphene oxide (GO) nanoplatelets or reduced graphene oxide (rGO) nanoplatelets, for example, and then the gas diffuses between graphene oxide layers and/or between flakes to provide effective gas flow.

A thickness of the gas separating active layer may be about 1 nm to about 6 μm, specifically about 5 nm to about 3 μm, more specifically about 10 nm to about 1 μm, and when the thickness of the gas separating active layer is in this range, gas permeability and selectivity may be excellent. If the thickness is too small, selectivity of the gas separation may be decreased. If the thickness is too large, permeability of the gas may be decreased.

The gas separation membrane according to an embodiment may selectively separate various gases. For example, the gas separation membrane may separate $H_2$ and $CO_2$, $H_2$ and CO, $H_2$ and $CH_4$, $H_2$ and $N_2$, He and $N_2$, $N_2$ and $CO_2$, $CH_4$ and $CO_2$, or a combination thereof.

A method of preparing the gas separation membrane, according to an embodiment, may include providing, e.g., preparing, a composition, e.g., a solution, by contacting, e.g., dispersing, a functionalized graphene in a solvent, disposing, e.g., coating, the composition on a porous layered support to form a coating, and drying the coating to form a gas separating active layer including the functionalized graphene layer on the porous layered support to prepare the gas separation membrane.

The functionalized graphene may comprise a graphene oxide, a reduced graphene oxide, or a combination thereof.

The method of preparing the gas separation membrane may further include reducing the functionalized graphene layer. The reducing of the functionalized graphene layer may occur after the forming of the gas separating active layer. The reducing may comprise contacting the functionalized graphene layer with hydrazine, HI, or a combination thereof.

The graphene oxide may be prepared using a method such as Brodie's method, Staudenmaier's method, or Hummer's method of preparing graphene oxide. In the Brodie method, graphite and $NaClO_3$ are mixed in a flask in an ice bath, $HNO_3$ is added, and the resulting slurry heated to about 60° C. for about 8 hours, followed by transfer into distilled water and washing the resulting suspension with 3M HCl. In the Staudenmaier method, a mixture of sulfuric acid and nitric acid are cooled in an ice bath, graphite is added thereto, and then potassium chlorate is added, followed by transfer into deionized water, filtering, and washing with HCl. The Hummers method includes stirring graphite with sodium nitrate and sulfuric acid in an ice bath, addition of potassium permanganate, heat treating at about 35° C., dilution with water, treatment with 3% hydrogen peroxide, filtering, and washing the resulting product with water. The graphene oxide may be obtained by reacting graphite and an acid to provide a graphite containing an oxygen-containing functional group, such as a hydroxyl group, an epoxide group, a carboxyl group, a lactone group, an aldehyde group, an ester group, a carbonate group, a peroxide group, an ether group, an acetal group, an acetal group or the like, or a combination thereof.

For example, a graphite oxide may be obtained by adding $KMnO_4$ to a mixture of a graphite and $H_2SO_4$ to oxidize the graphite, removing a residue of the product, and collecting precipitated particles by centrifuging the product.

A graphene oxide layer may be formed through a coating-process by dispersing the obtained graphene oxide in a solvent to prepare a composition which may be a solution or a suspension, and coating the composition on a porous layered support. Unlike a carbon molecular sieve (CMS) active layer, when the graphene oxide layer is formed through the coating-process, heat treating at a high-temperature can be omitted, and thus a manufacturing processes may be more convenient. Also, a material for the porous layered support may include a polymer, a glass, a metal, a ceramic, or a combination thereof, and thus, processability and modularity may be improved.

The graphene oxide may be coated on the porous layered support using spin coating, spray coating, bar coating, or a combination thereof. If vacuum filtration, direct evaporation, high-pressure filtration, or the like is used, a suitable thin film may not be obtained, and macro-cracks, e.g., cracks having a width greater than 5 μm, may be generated by forming liquid channels due to the solvent that permeates through the graphene oxide layer. Thus, desirable gas selectivity may not be obtained if vacuum filtration, direct evaporation, high-pressure filtration, or the like is used, and gas permeation may be difficult if the film is too thick.

The solvent may be removed by drying the coated solution of the graphene oxide. The coating and drying processes may be repeated to form multiple layers of the graphene oxide layer.

A thickness of the prepared gas separating active layer may be about 1 nm to about 6 μm, specifically about 5 nm to about 3 μm, more specifically about 10 nm to about 1 μm.

The graphene oxide may be reduced using a chemical or thermal reduction method. The chemical reduction method may be performed using various reducing agents, such as hydrazine, $NaBH_4$, a combination of HI and acetic acid (HI/AcOH), $NaOH/KOH/NH_3$, a metal, phenyl hydrazine, or the like, or a combination thereof. Also, the graphene oxide may be reduced by heating after being dispersed in the solvent. The heating may be performed by thermally treating the graphene oxide in vacuum or inert gas, such as $N_2$ or Ar, atmosphere at a temperature of about 600° C. or less, specifically about 200° C. to about 550° C., more specifically about 250° C. to about 500° C. When the graphene oxide is reduced, the oxygen-containing functional groups may be substantially or entirely removed, and an amount of the removed oxygen-containing functional groups and a distance between the layers may be controlled according to the reaction time.

The graphene oxide layer of the gas separation membrane may be reduced through an additional chemical reduction method. Also, a degree of reduction of the functionalized graphene on an outer surface of the gas separation membrane may be different from a degree of reduction of the functionalized graphene adjacent to and/or attached to the surface of the porous layered support, and thus the gas separating active layer may have an anisotropic structure.

Hereinafter, the disclosed embodiments will be described in further detail with reference to the following examples, which are for illustrative purposes only and shall not limit the scope of this disclosure.

Example 1

Preparation of Graphene Oxide Solution 10 g of graphite (available from Sigma-Aldrich) was mixed with 150 mL of 97 weight percent (wt %) sulfuric acid (available from Sigma-Aldrich). Then, 31.5 g of $KMnO_4$ was added, and the mixture was stirred for 24 hours to oxidize the graphite. The resultant was mixed with 35 mL of 50 wt % $H_2O_2$ (available from Sigma-Aldrich) to remove the chemical residue, and the small particles were collected by centrifuging at 4000 revolutions per minute (RPM) for 30 minutes and drying the resulting graphene oxide at 80° C. for 24 hours in vacuum. 0.1 g of the dried graphene oxide was then dispersed in water at pH of about 8 to about 9 using a sonicator, and a 1 milligram per milliliter mg/mL of a graphene oxide solution was obtained.

Preparation of Gas Separation Membrane

The prepared graphene oxide solution was spin coated on a porous polysulfone (PSF) support with dimensions of 6×6 square centimeter ($cm^2$) in area and with a thickness of 180 μm at 3000 RPM for 60 seconds. The resulting film was dried in a vacuum oven at 80° C. for 24 hours to dry the film. A graphene oxide active layer having a thickness of about 250 nm was formed as a result of the process. The C/O ratio of the graphene oxide, when measured by X-ray photoelectron spectroscopy (XPS) (QUANTUM 2000, available from Physical electronics) was 1.76.

Example 2

A gas separation membrane including a graphene oxide active layer with a thickness of about 350 nm was prepared in the same manner as in Example 1, except that the graphene oxide solution was spin coated 3 times in order to obtain a separation active layer containing 1 milligram (mg) of graphene oxide per unit area of the gas separation membrane.

Example 3

A gas separation membrane including a graphene oxide active layer with a thickness of about 700 nm was prepared in the same manner as in Example 1, except that the graphene oxide solution was spin coated 5 times in order to obtain a separation active layer containing 2 mg of graphene oxide per unit area of the gas separation membrane.

Example 4

The graphene oxide prepared in Example 2 was hung on an upper part of a sealed container, and a surface of the graphene oxide was exposed to 200 mL of a solution of acetic acid and iodic acid that are mixed at ratio of 20:1 at 40° C. for 12 hours to be reduced. The reduced graphene oxide (rGO) gas separation membrane was washed with 200 mL of 0.1 molar (M) $NaHCO_3$ and 200 mL of MeOH to remove any chemical residue, thereby preparing a gas separation membrane with a C/O ratio of 3.45.

Example 5

A gas separation membrane with a C/O ratio of 3.76 was prepared in the same manner as in Example 4, except that the graphene oxide was exposed to the solution for 24 hours instead of 12 hours as in Example 4 to be reduced.

Comparative Example 1

A gas separation membrane was prepared in the same manner as in Example 1, except that the graphene oxide solution prepared in Example 1 was vacuum filtered on the PSF using a vacuum pump at 647 torr (Gast model DOA-P704-AA) to form the gas separation membrane active layer.

Comparative Example 2

A gas separation membrane was prepared in the same manner as in Comparative Example 1, except that the graphene oxide solution was vacuum filtered using a high-vacuum pump at $5 \times 10^{-4}$ torr (Laco model W2V20).

Comparative Example 3

A CMS gas separation membrane was prepared by following a method prescribed in H. Suda, K. Haraya, J. Phys. Chem. B (1997) 101, 3988, at 973° C. in an air atmosphere.

Comparative Example 4

A CMS gas separation membrane was prepared by following a method prescribed in H. Suda, K. Haraya, J. Phys. Chem. B (1997) 101, 3988, at 1073° C. in an air atmosphere.

Comparative Example 5

A CMS gas separation membrane was prepared by following a method prescribed in H. Suda, K. Haraya, J. Phys. Chem. B, (1997) 101, 3988, at 1223° C. in an Ar atmosphere.

Figure 4A:
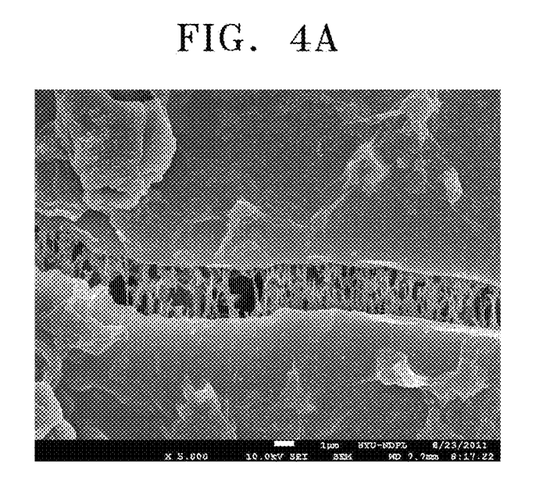
FIGS. 4A and 4B are scanning electron microscope (SEM) images of gas separating active layers prepared in Comparative Examples 1 and 2, respectively.
Figure 4B:
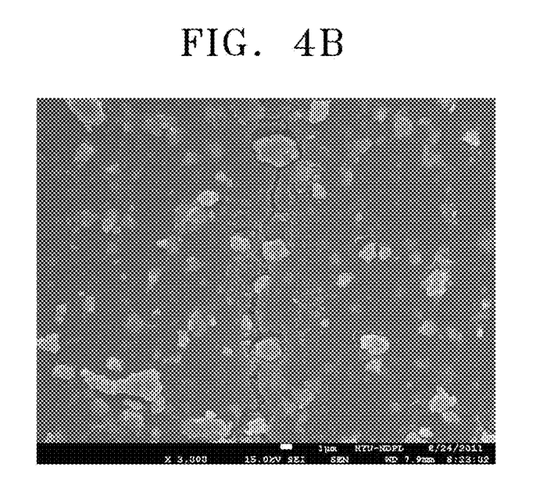

FIGS. 4A and 4B are scanning electron microscope (SEM) images of gas separating active layers prepared in Comparative Examples 1 and 2, respectively. As shown in FIGS. 4A and 4B, when a gas separating active layer is formed using a filtering method, cracks were generated after drying, and even when a filtering pressure was controlled to be high generation of macro-cracks was still not prevented.

Figure 5A:
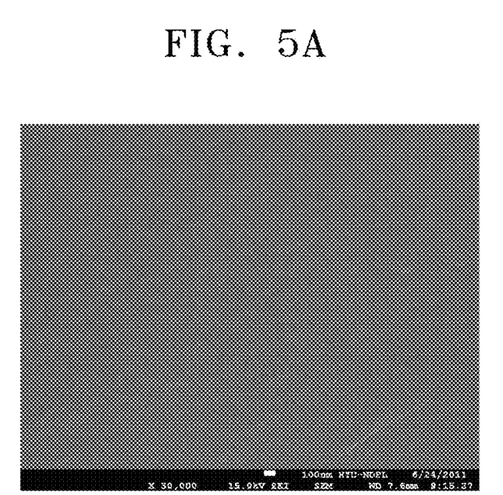
FIG. 5A is a SEM image of the gas separating active layer prepared in Example 1.
Figure 5B:
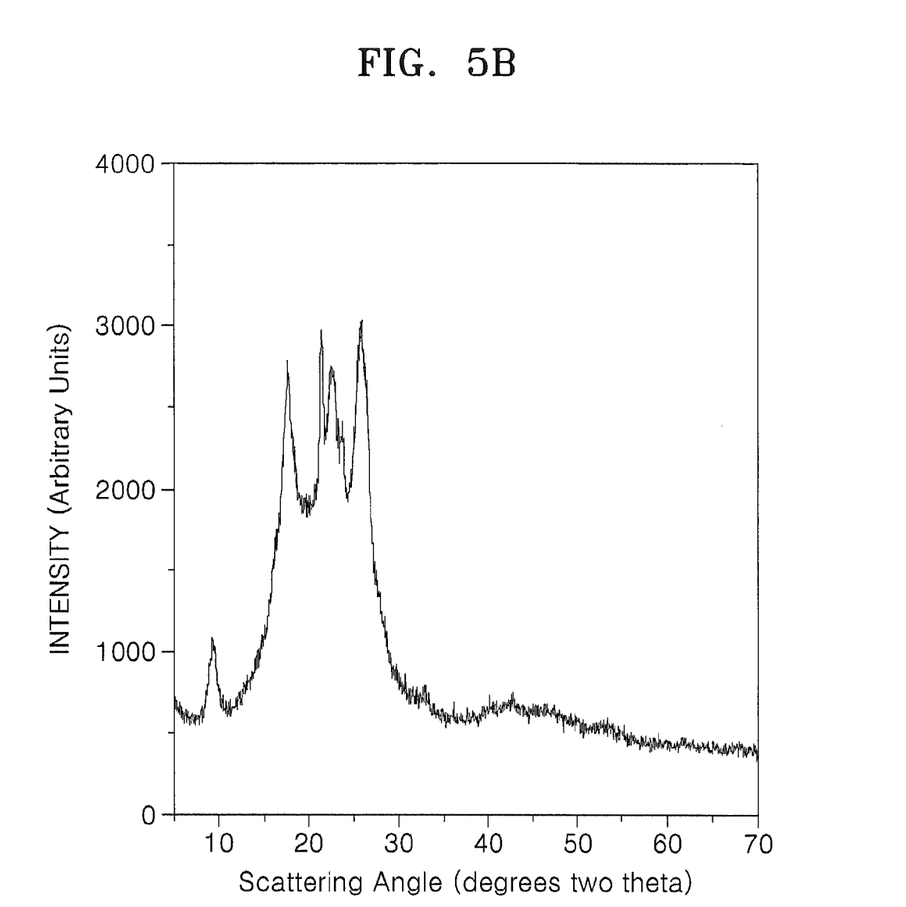
FIG. 5B is a graph of intensity (arbitrary units) versus scattering angle (degrees two-theta, $2\theta$) showing the results of X-ray diffraction (XRD) analysis of the gas separating active layer prepared in Example 1.
Figure 5C:
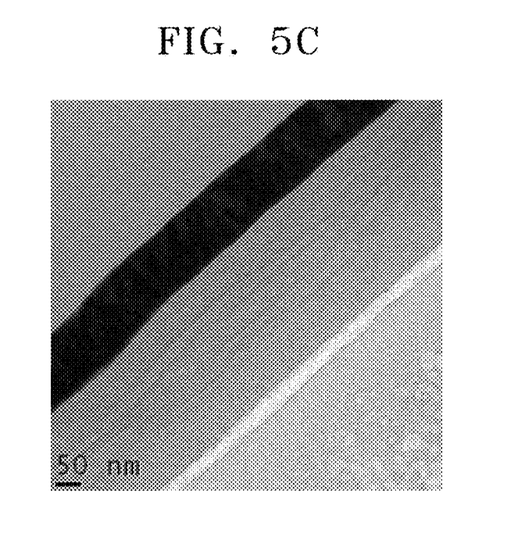
FIG. 5C is a cross-section transmission electron microscopy (TEM) image of the gas separating active layer prepared in Example 1.

FIGS. 5A-5C include a SEM image (FIG. 5A), an XRD pattern (FIG. 5B), and a cross-section transmission electron microscopy (TEM) image (FIG. 5C) of the gas separating active layer prepared in Example 1 according to an embodiment. As shown in FIG. 5A, when a gas separating active layer was formed using a spin coating method, macro-cracks were not formed. Also, as shown in FIG. 5B, it is confirmed that a graphene oxide layer was formed. Moreover, as shown in FIG. 5C, a thickness of the graphene oxide layer was about 300 nm, and it may be confirmed that no cracks were formed in the region analyzed.

The gas separation membranes prepared in Examples 1 to 3 were tested for gas permeability and selectivity.

The gas permeability was measured using a constant-pressure variable-volume method with a high pressure 47 mm stainless steel filter holder (Millipore Corp. model xx4504700).

According to a constant-pressure variable-volume method, the gas to be measured circulates into both an upper portion and a lower portion of a cell to remove other impurity gases and fixes pressure of an upper feed to be constant (normally a filtering portion maintains atmospheric pressure). As time goes by, a speed of the gas passing through the separation layer reaches a steady-state, and when the gas permeation amount becomes constant, a volume of the gas that is permeated through the separation layer per unit time is measured. The measuring device may be a bubble flowmeter (or a digital flowmeter), and the permeability may be measured using Equation 1. In general, a constant-pressure variable-volume method is useful in measuring permeability of a separation layer with a material having a high permeate flow rate.

$$\text{Permeability} = \frac{l}{p_2 - p_1} \frac{273 p_{otm}}{TA76} \left(\frac{dV}{dt}\right) \quad \text{Equation 1}$$

In Equation 1, $p_1$: normal pressure (cmHg), $p_2$: feed pressure, l: thickness of gas separation membrane (cm), T: temperature (K), $$\frac{dV}{dt}:$$

flow rate (cm³/s)).

Figure 6:
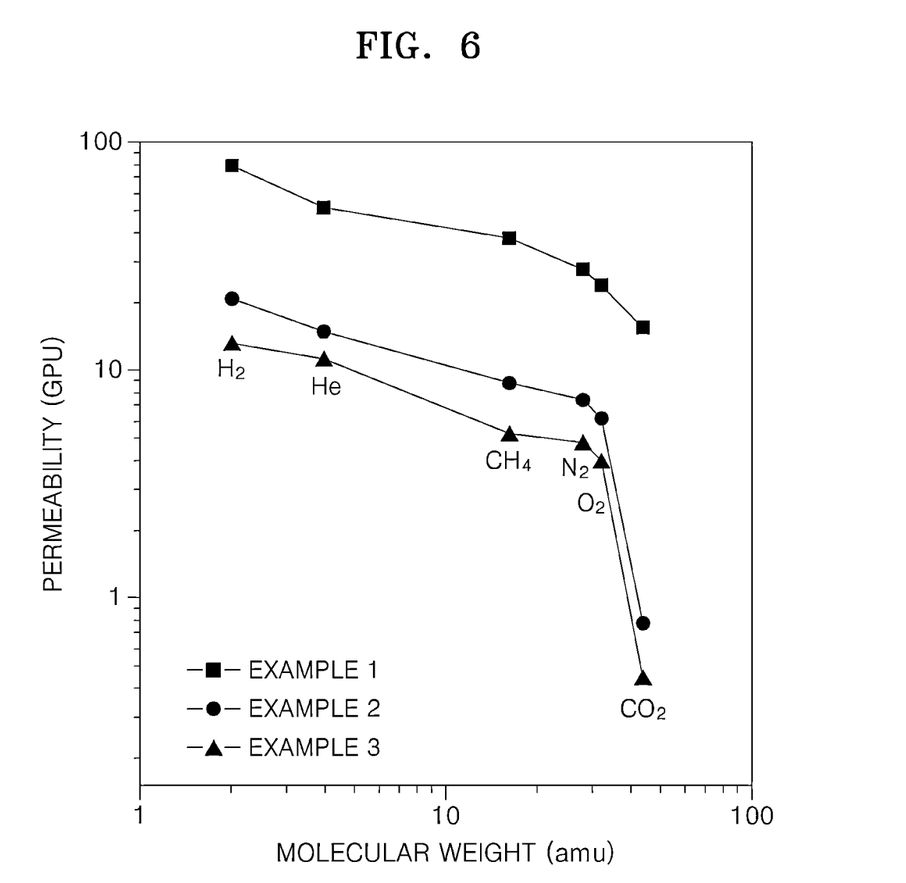
FIG. 6 is a graph of permeability (gas permeation units, GPU) versus molecular weight (atomic mass units, amu) of the gas separation membranes prepared in Examples 1 to 3.
Figure 7:
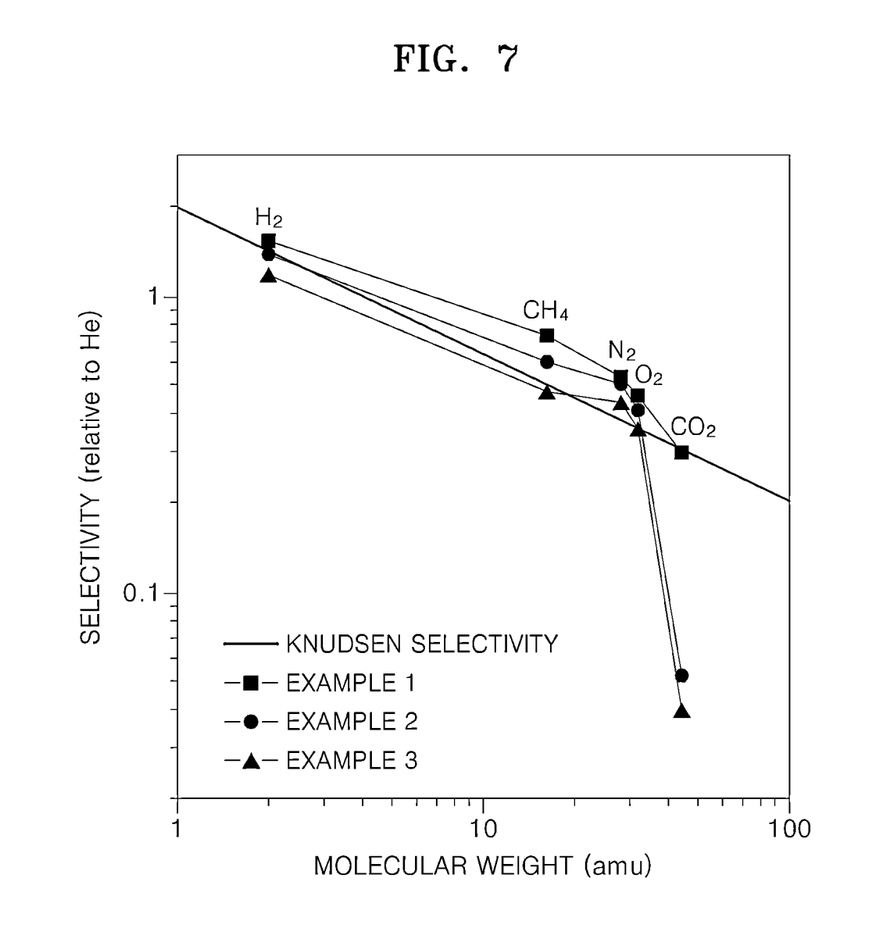
FIG. 7 is a graph of selectivity relative to He versus molecular weight (atomic mass units, amu) showing the gas selectivity for He gas of the gas separation membranes prepared in Examples 1 to 3.

FIGS. 6 and 7 show permeability for $H_2$, He, $CH_4$, $N_2$, $O_2$, and $CO_2$, and selectivity for He, respectively, of the gas separation membranes prepared in Examples 1 to 3.

FIG. 6 is a graph showing permeability of the gas separation membranes for each gas. As a molecular weight of the gas increases, the permeability decreases, and the permeability of $CO_2$ particularly decreased compared to the other gases. Also, as a thickness of the graphene oxide, which is a gas separating active layer, increases, permeability according to the molecular weight of the gas decreases, and the difference of permeability of $CO_2$ particularly was greater than the other gases.

As shown in FIG. 7, the gas selectivity is shown as being affected by a molecular weight of the gas, and this almost agrees with a theoretical Knudsen selectivity value. However, the gas selectivity of $CO_2$ is off the theoretical Knudsen selectivity value because $CO_2$ adheres to the graphene oxide. In this regard, a gas that is mixed with $CO_2$ may be easily separated.

In addition, $H_2/CO_2$ selectivity of a CMS gas separation membrane that is formed at a high temperature and the gas separation membranes prepared in Examples 1 to 3 were compared.

Figure 8:
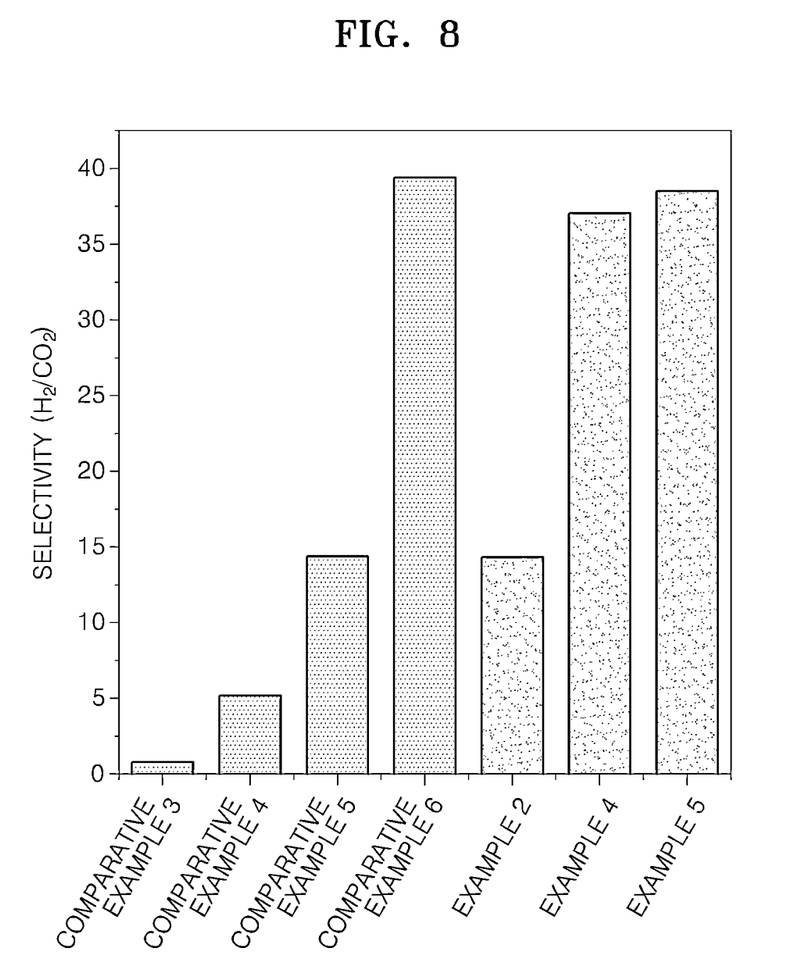
FIG. 8 is a graph showing $H_2/CO_2$ selectivity of the gas separation membranes prepared in Examples 2, 4, and 5 and Comparative Examples 3 to 6.

FIG. 8 shows $H_2/CO_2$ selectivity of the gas separation membranes prepared in Examples 2, 4, and 5 and Comparative Examples 3 to 6. As shown in FIG. 8, the gas separation membrane according to an embodiment showed a gas selectivity that is equal to or better than a conventional CMS gas separation membrane even at room temperature, and particularly, the selectivity was improved when a portion of the graphene oxide was reduced. That is, the selectivity of the gas separation membrane according to an embodiment showed almost the same selectivity as the CMS gas separation membrane that was obtained in Ar atmosphere at a high temperature of 1223° C.

Figure 9:
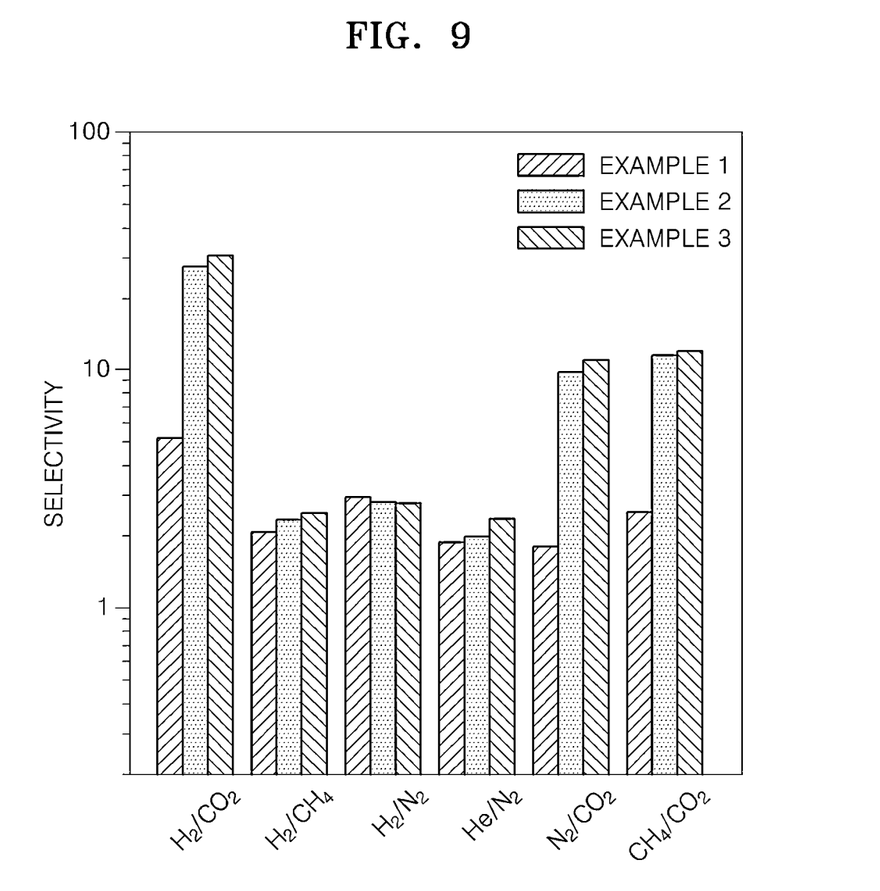
FIG. 9 is a graph showing $H_2/CO_2$, $H_2/CH_4$, $H_2/N_2$, $He/N_2$, $N_2/CO_2$, and $CH_4/CO_2$ selectivity of the gas separation membrane prepared in Example 2.

Also, FIG. 9 is a graph showing $H_2/CO_2$, $H_2/CH_4$, $H_2/N_2$, $He/N_2$, $N_2/CO_2$, and $CH_4/CO_2$ selectivity of the gas separation membrane prepared in Example 2.

As described above, according to an embodiment, a gas separation membrane that has a high gas permeation rate, an excellent selectivity for a particular gas mixture, and convenient manufacture are provided.

It should be understood that the exemplary embodiments described herein shall be considered in a descriptive sense only and not for purposes of limitation. Descriptions of features, advantages or aspects within each embodiment should be considered as available for other similar features, advantages or aspects in other embodiments.

What is claimed is:

1. A gas separation membrane comprising:
   a porous layered support; and
   a gas separating active layer which is disposed on the porous layered support and which consists of 2 to 100 layers of a functionalized graphene,
   wherein the gas separating active layer is effective to separate $H_2$ and $CO_2$, $H_2$ and CO, $H_2$ and $CH_4$, $H_2$ and $N_2$, He and $N_2$, $N_2$ and $CO_2$, $CH_4$ and $CO_2$, or a combination thereof, and comprises a crack having a width of about 100 nanometers or less.

2. The gas separation membrane of claim 1, wherein the functionalized graphene is a graphene oxide, a reduced graphene oxide, or a combination thereof.

3. The gas separation membrane of claim 2, wherein the functionalized graphene has a C/O content ratio of about 1 to about 9.5.

4. The gas separation membrane of claim 1, wherein a thickness of the gas separating active layer is about 1 nanometer to about 6 micrometers.

5. The gas separating membrane of claim 1, wherein the functionalized graphene further comprises a nitrogen functional group, a phosphorus functional group, a sulfur functional group, a hydrocarbon functional group, a halogen functional group, or a combination thereof.

6. The gas separating membrane of claim 1, wherein the functionalized graphene is in the form of a flake.

7. The gas separation membrane of claim 1, wherein the porous layered support comprises a metal, a ceramic, or a polymer, or a combination thereof.

8. The gas separation membrane of claim 7, wherein the metal is iron, steel, or a combination thereof.

9. The gas separation membrane of claim 7, wherein the ceramic is at least one selected from glass, $Al_2O_3$, zirconia, $TiO_2$, zeolite, or a combination thereof.

10. The gas separation membrane of claim 7, wherein the polymer is polysulfone, polyvinylidene fluoride, cellulose, polyacrylonitrile, polyethersulfone, polyimide, or a combination thereof.

11. A gas separator comprising the gas separation membrane of claim 1.

* * * * *